(12) United States Patent
Zhu et al.

(10) Patent No.: US 11,155,485 B2
(45) Date of Patent: Oct. 26, 2021

(54) HIGH-PURITY SEPARATION METHOD OF IRON IONS FROM AN AQUEOUS SOLUTION CONTAINING HEAVY METAL IONS

(71) Applicant: Northeast Normal University, Changchun (CN)

(72) Inventors: Suiyi Zhu, Changchun (CN); Zhan Qu, Changchun (CN); Yang Huo, Changchun (CN); Jiancong Liu, Changchun (CN); Rui Bian, Changchun (CN)

(73) Assignee: NORTHEAST NORMAL UNIVERSITY, Changchun (CN)

( * ) Notice: Subject to any disclaimer, the term of this patent is extended or adjusted under 35 U.S.C. 154(b) by 236 days.

(21) Appl. No.: 16/507,197

(22) Filed: Jul. 10, 2019

(65) Prior Publication Data

US 2020/0317552 A1 Oct. 8, 2020

(30) Foreign Application Priority Data

Apr. 3, 2019 (CN) .......................... 201910265434.7

(51) Int. Cl.
| | |
|---|---|
| *C02F 1/00* | (2006.01) |
| *C02F 1/52* | (2006.01) |
| *C02F 1/64* | (2006.01) |
| *C02F 1/70* | (2006.01) |
| *C02F 101/20* | (2006.01) |
| *C02F 9/00* | (2006.01) |

(52) U.S. Cl.
CPC .............. *C02F 9/00* (2013.01); *C02F 1/5236* (2013.01); *C02F 1/64* (2013.01); *C02F 1/705* (2013.01); *C02F 2001/007* (2013.01); *C02F 2101/203* (2013.01); *C02F 2209/06* (2013.01)

(58) Field of Classification Search
CPC .... C02F 1/64; C02F 1/705; C02F 9/00; C02F 2001/007; C02F 2001/5218; C02F 2101/203; C02F 2209/06
See application file for complete search history.

(56) References Cited

U.S. PATENT DOCUMENTS 5,330,658 A * 7/1994 Grant .................... C02F 1/5236
210/717

FOREIGN PATENT DOCUMENTS

CN 107670636 A * 2/2018

OTHER PUBLICATIONS

Huo Hongliang—CN-107670636-A Machine Translation—Feb. 2018 (Year: 2018).*

* cited by examiner

*Primary Examiner* — Bradley R Spies
(74) *Attorney, Agent, or Firm* — Hauptman Ham, LLP

(57) ABSTRACT

The present invention discloses a high-purity separation method of iron ions from an aqueous solution containing heavy metal ions, wherein after pretreatment of an aqueous solution containing heavy metal ions, sedimentation containing iron ions are collected, nitric acid or sulfuric acid is added for dissolution, and then a reducing agent is added to the dissolved solution; and after heating and sealing reaction, red sedimentation is generated at the bottom, The sedimentation has a high purity, and the residual amount of iron in the solution is less than 0.4 mg/L. In the method, iron ions in the solution can be converted to hematite crystals at a high purity, and the solution has an excellent retention rate of heavy metal ions, the reaction time is short, the separation efficiency is high, the operation is simple, and the cost is low.

10 Claims, 4 Drawing Sheets

HIGH-PURITY SEPARATION METHOD OF IRON IONS FROM AN AQUEOUS SOLUTION CONTAINING HEAVY METAL IONS

TECHNICAL FIELD

The present invention relates to the field of environment and metallurgy, in particular to a high purity separation method of iron ions from an aqueous solution containing heavy metal ions.

BACKGROUND ART

As an active metal ion, iron is an element with its abundance ranking the fourth in the earth crust, and it accounts for about 95% of all the metals used in industry and agriculture. Iron can generally coexist with other heavy metal ions (specifically referring to metals with a specific gravity of greater than 4.5 g/cm$^3$), this is mostly owing to mineral chemical reaction that iron participates, while a small part owing to the adsorption and coprecipitation reaction of heavy metal ions by hydrolysis of iron ions. It is of a dramatic advantage to separate iron from heavy metal ions. For example, when the content of trace iron in silver products is lowered, the quality of silver can be improved. For another example, when iron in heavy metal waste sludge is removed, the purity of a heavy metal can be dramatically improved, thereby changing dangerous wastes into precious resources.

Iron coexists with heavy metal ions in two ways: solids containing iron and solutions containing iron. As to solids containing iron, the separation and purification manners are divided into the following types: (1) iron oxides are converted into magnetic material, and then magnetic field separation is adopted, or a strong magnet is used directly to separate weakly-magnetic iron oxides; and (2) acid is used to dissolve solids containing iron to separate ions or iron ions therein, and this method is similar to the method for separating iron from a solution, which will be described below. Shortcomings of method (1) are as follows: iron oxides contain a large number of coordination sites on their surfaces, such that the heavy metal ions can be coordinated and adsorbed to the surfaces. Most iron oxides are positively charged, and tend to adsorb negatively charged particles containing heavy metal ions. Therefore, when high purity separation of iron is pergenerated by adopting method (1), attachments on the surface of iron oxides are difficult to remove, the separation is very difficult, and conditions are harsh.

As to solutions containing iron, the separation and purification manners are divided into the following types:

(1) the pH value is adjusted to 4, hydroxide sedimentation of iron is generated; (2) the pH value is adjusted, sodium sulfide is added, and sulfide sedimentation is generated; (3) phosphate is added, and saturated iron phosphate sedimentation is generated; (4) the pH value is adjusted, oxalic acid is added, and iron oxalate sedimentation is generated; (5) an extracting agent with a special structure is synthesized, and iron is extracted and removed from the solution; and (6) iron in the solution is removed with an ion exchange resin, by chelation of a special functional group on the surface of the resin.

The above method has the following shortcomings from the point of view of separation principles:

(1) After the pH rises, a ferric hydroxide colloid is generated through hydrolysis of iron ions, the ferric hydroxide colloid has a strong affinity to heavy metal ions, charged organic matters and colloids in the water, and can adsorb such substances to its surface and remove them from water through a manner of generating sedimentation or colloid cladding, thereby lowering the retention rate of heavy metal ions. (2) The added sulfide, phosphoric acid and oxalic acid will all combine with heavy metal ions to generate sedimentation, thereby forming co-precipitating substances of heavy metals and iron, and dramatically lowering purification efficiency. (3) After an extracting agent is used to remove iron, iron with a low concentration (1-10 mg/L) will be residue, which is not beneficial for subsequent recycling of other heavy metal ions. (4) When the concentration of iron ions in the solution is low (lower than 10 mg/L), as influenced by the diffusion rate of ions in the solution, the exchange rate of ions is low, the separation time is long and the efficiency is low.

Through summarization, the existing removal technology of iron ions from solutions has the following characteristics:

(1) when the concentration of iron ions in the solution is high, in the precipitation process of iron ions, a large number of heavy metal ions in the solution will be trapped to form co-precipitates, thereby dramatically lowering content of to-be-reserved heavy metal ions in the solution; and (2) when the concentration of iron ions in the solution is low, when sedimentation is generated, a large number of reagents to promote generation of sedimentation (for example, sulfide) or reagents with a higher pH value need to be added; in addition, in the generated sedimentation containing iron, the content of heavy metal ions is high, thereby leading to further difficulty in separating iron from this part of precipitate.

Different from the above methods, a high-purity separation method of iron ions from an aqueous solution containing heavy metal ions is provided. By adopting the method, iron ions in the solution can be converted to high-purity hematite crystals, and the solution shows an excellent retention rate of heavy metal ions.

SUMMARY OF THE INVENTION

In view of the shortcomings of the above separation technology, an objective of the present invention is to provide a high-purity separation method of iron ions from an aqueous solution containing heavy metal ions. After being treated by adopting the method, the solution shows an extra-low iron residual amount and a high retention rate of metal ions.

In order to solve the above technical problem, the solutions in the present invention are as follows:

A high-purity separation method of iron ions from an aqueous solution containing heavy metal ions includes the following steps:

I. selection of an aqueous solution containing heavy metal ions (1) the heavy metal in the aqueous solution refers to a metal with a density of greater than 4.5 g/cm$^3$ and a concentration of greater than 0.02 mg/L.

II. pretreatment of an aqueous solution containing heavy metal ions (2) adding ferric salt to the aqueous solution, wherein the ferric salt includes but is not limited to polymerization ferric chloride, polymeric ferric sulfate or polymerized ferric nitrate and the dosage of added polyferric ferric chloride, polyferric ferric sulfate or polyferric ferric nitrate is 0.1-1 g/L;

(3) adjusting the pH value of the aqueous solution to 8-11;

wherein the methods of adjusting the pH value in step (3) include but are not limited to using acid or alkali or adding solids containing metallic oxides;

(4) collecting sedimentation containing ferric iron ions at the bottom.

III. dissolution of sedimentation (5) dissolving sedimentation by using a nitric acid solution or a sulfuric acid solution, until iron nitrate crystals or iron sulfate crystals are generated at the bottom or the pH value of the solution is −0.5-1.9;

in the method, the concentration of used nitric acid or sulfuric acid is 35%-65%;

as to the solution treated with nitric acid or sulfuric acid, the concentration of iron ions is greater than 100 mg/L, and the concentration of heavy metal ions is greater than 40 mg/L.

IV. treatment of solution dissolved with nitric acid (6) directly adding a reducing agent to the solution which is dissolved with nitric acid, wherein the reducing agent is levulinic acid, or a mixture of levulinic acid;

in the method, wherein the mixture of levulinic acid includes pyruvic acid, lactic acid, lactose, galactose and levulinic acid;

in the method, wherein the mixture ratio of the pyruvic acid, lactic acid, lactose, galactose and levulinic acid in the mixture is 1:1:5:1:100; and in the method, wherein the dosage of added reducing agent in step (6) is calculated according to the formula that the molar ratio of the sum of total molar of each component in the reducing agent to iron in the solution is 0.1-10, preferably 0.5-5, and more preferably 0.5-3.

V. treatment of solution dissolved with sulfuric acid (7) adding sodium nitrate or sodium nitrite to the solution obtained by dissolving with sulfuric acid;

in the method, wherein the added dosage of sodium nitrate or sodium nitrite in step (7) is calculated according to the formula that a molar ratio of sodium nitrate or sodium nitrite to iron ions in the solution to be greater than 0.5; preferably, the molar ratio of sodium nitrate or sodium nitrite to iron ions in the solution is 3-10:1.

(8) adding a reducing agent according to step (6).

VI. hydrothermal reaction (9) transferring the aqueous solution into a reactor, wherein the aqueous solution refers to the aqueous solution obtained in step (6) or the aqueous solution obtained after steps (7) and (8).

In the method, wherein a degree of filling of the reactor in step (9) is 30%-80%, the aqueous solution in the reactor is heated in an airtight manner to 120-500° C., the temperature is kept for 0.1-48 h, and the aqueous solution is naturally cooled to room temperature;

in the method, wherein the degree of filling of the reactor is preferably 30%-50%, the aqueous solution in the reactor is preferably heated in an airtight manner to 120-250° C., and the temperature is preferably kept for 3-20 h.

VII. judgment of reaction endpoint

(10) opening the reactor, and red sedimentation is generated at the bottom, wherein the sedimentation is mainly $Fe_2O_3$ with a purity of greater than 98.5%, the residual amount of iron in a supernatant is less than 0.4 mg/L, and the retention rate of ions is greater than 95%.

VIII. Separation method of iron (with the iron being divalent iron ions) from solids containing heavy metal ions

(11) dissolving solids or sedimentation containing heavy metals and iron in a sulfuric acid solution, until the pH value is −0.5-1.9, then an aqueous solution containing divalent iron ions and heavy metals and dissolved with sulfuric acid is generated;

in the method, wherein the concentration of used sulfuric acid is 35%-65%;

as to the solution treated with sulfuric acid, the concentration of divalent iron ions is greater than 100 mg/L, and the concentration of heavy metal ions is greater than 40 mg/L.

(12) transferring the solution with the pH being adjusted into a reactor, wherein a degree of filling is 30%-40%;

(13) closing the reactor in an airtight manner, after the temperature rises to 120° C., adding sodium nitrite through a feeding pipe, wherein the added dosage is calculated according to a formula that the molar ratio of sodium nitrite to iron ions is greater than 0.5, and then performing high-purity precipitation and separation of iron according to steps (9) to (10).

The molar ratio of the added sodium nitrite to iron ions is 3-10:1.

Compared with other methods for separating iron, in the present invention, iron in a solution can be simultaneously converted into high-purity hematite crystals, and the solution has a high retention rate of metal ions. Compared with such reducing agents as glucose, glycol and sodium ascorbate, the reagent adopted in the present invention has a more favorable iron ion crystallization effect and a more efficient retention rate of metal ions. In the present invention, with regard to the solution in which irons are all divalent irons, a method is provided in which no organic reducing agent is used and hydrothermal crystallization is directly used, and its effect is similar to the effect of using reagents.

Beneficial effects of the present method:

(1) the coordination reagent has an excellent iron separation effect of iron salt, the dry sedimentation is mainly high-purity iron oxides, and the concentration of residual iron is lower than 0.5 mg/L;

(2) aiming at the solution containing divalent iron ions, nitrite is added to replace nitrate, thereby rapidly precipitate divalent iron ions at a high purity, avoiding using levulinic acid or composite reagents, and saving reagents and costs;

(3) after the solution is treated by adopting the method, the retention rate of ions is stably higher than 95%, thereby realizing high-purity enrichment of ions;

(4) the method is applied to a wide pH range and a wide concentration range of iron ions, the separation speed is high, and the reaction time is dramatically shortened;

(5) the present method can be adopted to enrich low-concentration heavy metal ions in water, the effect is favorable, and the enriched heavy metal ions have high concentration and high purity;

(6) the present method can also be adopted to remove iron impurities in the solid containing heavy metals.

DETAILED DESCRIPTION OF THE EMBODIMENTS

Figure 1:
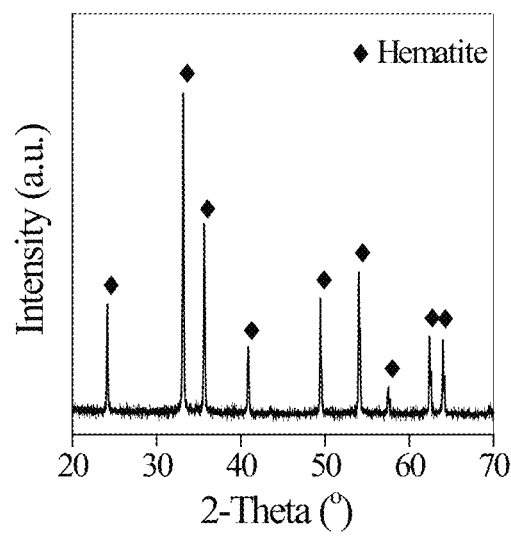
FIG. 1 is an XRD graph of sedimentation with hematite as its main component.

Embodiment 1: Separation Method of Iron (with the Iron Being Ferric Ions) from an Aqueous Solution Containing Heavy Metal Ions I. A pickling solution from precious metal processing was selected, wherein the pH was 1.1, and the main components were as follows: 1.4 mg/L of Pt, 28.8 mg/L of Mg, 3.7 mg/L of As, 1.5 mg/L of Hg, 2.6 mg/L of In, 114 mg/L of Pb, and 11.3 mg/L of Te, and the major anion was $SO_4^{2-}$.

II. A polyferric sulfate flocculating agent was added at a dosage of 0.3 g/L, NaOH was used to adjust the pH value of a pickling solution to 10.5 to generate sedimentation containing iron, and the sedimentation was collected, and dried at 105° C. for 5 h for standby use.

III. Sedimentation was added to nitric acid to be dissolved, with the concentration of nitric acid being 35%, after the pH of the solution was 0.3, adding of sedimentation was stopped. Then the content of $Fe^{3+}$ was detected to be 8449 mg/L, while Pt was 41.2 mg/l, Mg was 611 mg/L, As was 105 mg/L, Hg was 46.4 mg/L, In was 78.5 mg/L, Pb was 3305 mg/L, and Te was 298 mg/L.

IV. Levulinic acid was added to the solution, the added dosage was calculated according to the formula that the molar ratio of levulinic acid to total iron was 0.85, and the adding way was dry powder dosing.

V. The mixed solution obtained in step (IV) was constantly stirred for 10 min at a rotating speed of 150 rpm, and was then transferred to a reactor with a degree of filling being 65%, the temperature rose to 320° C. directly, and was kept for 0.5 h, and then the mixed solution was cooled to room temperature naturally.

Figure 2:
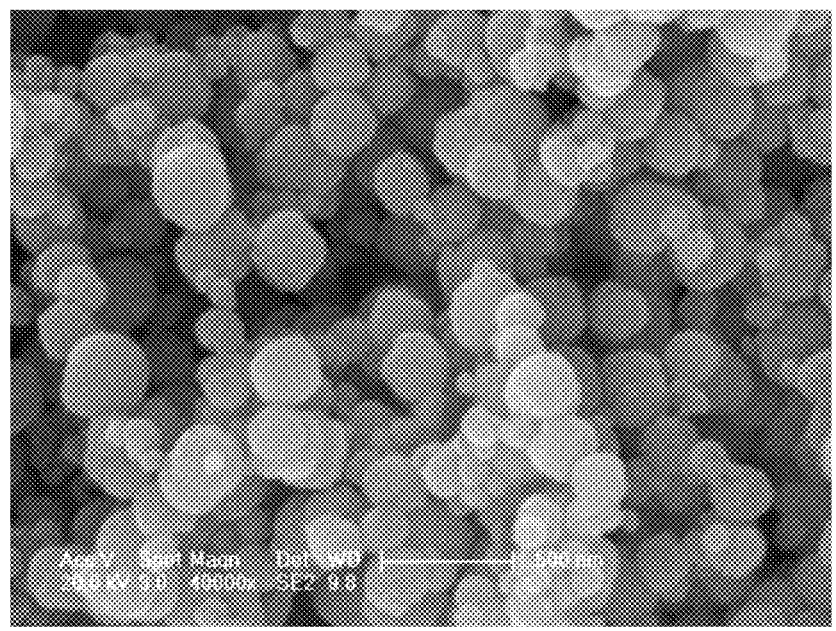
FIG. 2 is a morphology structural diagram of sedimentation with hematite as its main component.

VI. Brick-red sedimentation was generated at the bottom of the reactor. An XRD graph was as shown in FIG. 1 which showed that the main component of the sedimentation was hematite. For its morphology, please refer to FIG. 2.

Figure 3:
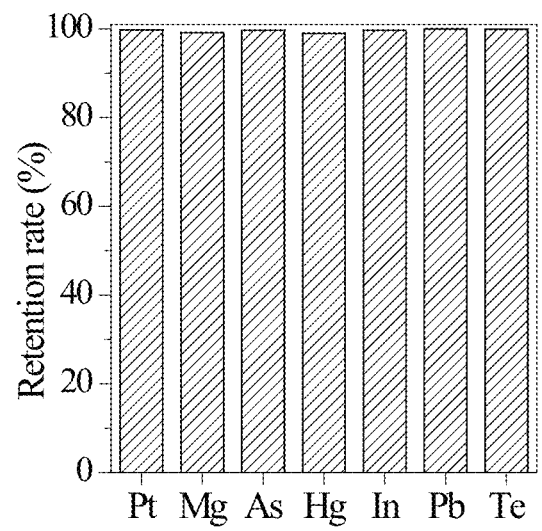
FIG. 3 is a diagram showing retention rate of Pt, Mg, As, Hg, In, Pb and Te.

VII. After the reaction, the concentration of $Fe^{3+}$ in a supernatant was 0.18 mg/L, no $Fe^{2+}$ was generated, and the retention rate of Pt, Mg, As, Hg, In, Pb and Te was separately higher than 98.87%, as shown in FIG. 3.

Embodiment 2: Separation Method of Iron (with the Iron Being Divalent Iron Ions) from Solids Containing Heavy Metal Ions I. A metal block of copper and zinc contained an iron impurity of 1.4 wt. %.

II. The metal blocks of copper and zinc were dissolved in sulfuric acid of 35%, and when the pH value was 0.3, adding of metal block of copper and zinc was stopped.

III. The concentration of iron in a solution was detected to be 5.2 g/L, the concentration of Cu was 3.3 g/L, and the concentration of Zn was 0.9 g/L, wherein the iron was divalent iron.

IV. The solution in step (III) was transferred into a reactor, with a degree of filling being 30%, after the temperature rose to 120° C., a sodium nitrite aqueous solution at a concentration of 2M was added, and the added dosage was calculated according to the formula that the molar ratio of sodium nitrite to iron was 1.5. The temperature was kept for 18 h, and then the solution was cooled to room temperature naturally.

Figure 4:
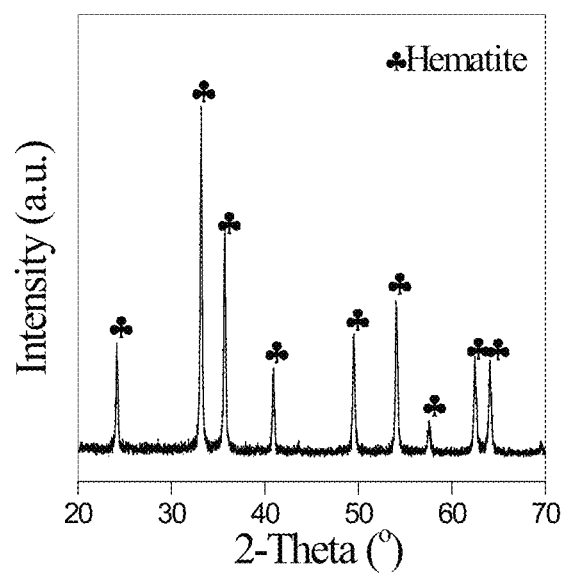
FIG. 4 is an XRD graph of hematite with a high crystallinity
Figure 5:
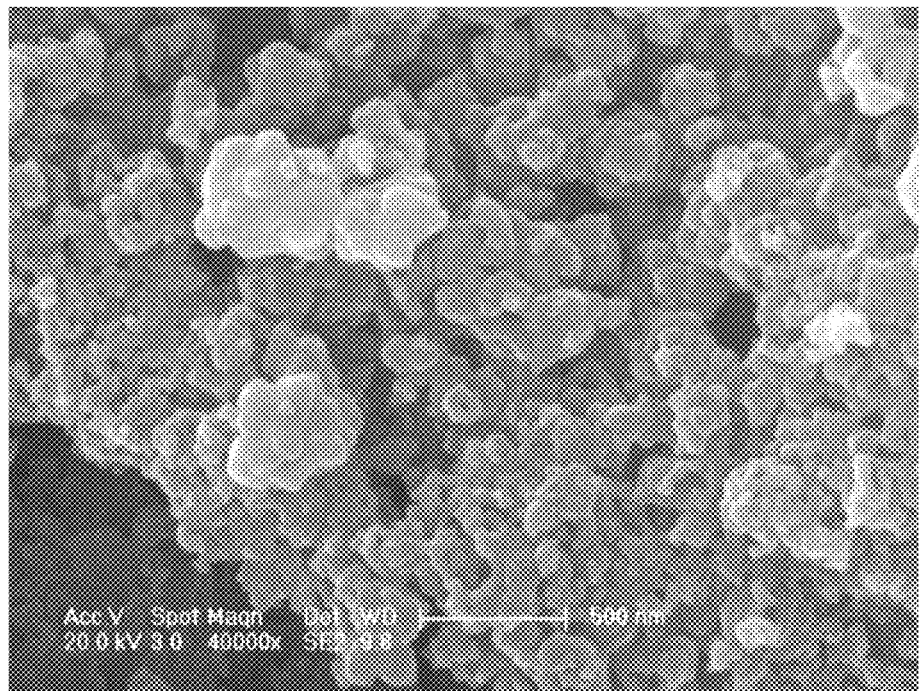
FIG. 5 is a morphology structural diagram of hematite with a high crystallinity.

V. Red sedimentation was generated at the bottom of a reactor, the concentration of iron ions in the supernate was 0.36 mg/L, and the concentrations of Cu and Zn were respectively 3.28 g/L and 0.89 g/L. After red sedimentation was dried, the XRD graph was as shown in FIG. 4, showing that the sedimentation was a hematite with a high crystallinity, with its morphology being as shown in FIG. 5. After being treated by adopting the present method, Cu and Zn in heavy metal wastewater containing Cu and Zn were enriched at a high purity.

Embodiment 3: Separation Method of Iron (with the Iron Being Ferric Ions) from Solids Containing Heavy Metal Ions I. A silver block with the content of iron to be 4.2 wt. % was taken to be dissolved in a nitric acid of 65% and diluted for 10 times to obtain a nitric acid aqueous solution containing silver and iron. At this time, the content of silver in the aqueous solution was 4.5 g/L, the content of iron was 198 mg/L, and the irons were all ferric ions.

II. The pH of diluted solution was 0.5, the solution was then transferred to a reactor, and a mixture containing levulinic acid was added to the reactor. The molar ratio of the added amount of the mixture to the iron ions was 1, and the mixture contained pyruvic acid, lactic acid, lactose, galactose and levulinic acid, with a mixture ratio of 1:1:5:1:100.

III. the reactor in which the degree of filling was 65% was closed in an airtight manner, the temperature rose to 250° C. and the temperature was kept for 1.2 h, after which red sedimentation was generated at the bottom with a strong magnetic response. After red sedimentation at the bottom were separated with a magnet, the content of iron ions in the supernate was 0.31 mg/L, and the retention rate of Ag was higher than 99%.

Figure 6:
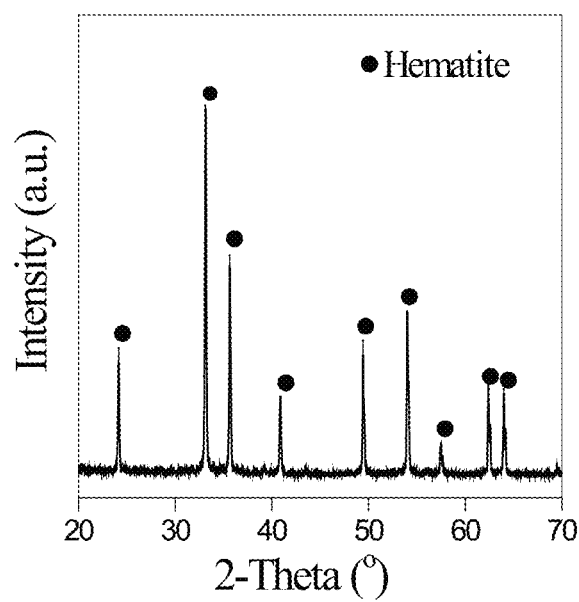
FIG. 6 is an XRD graph of red sedimentation at the bottom.
Figure 7:
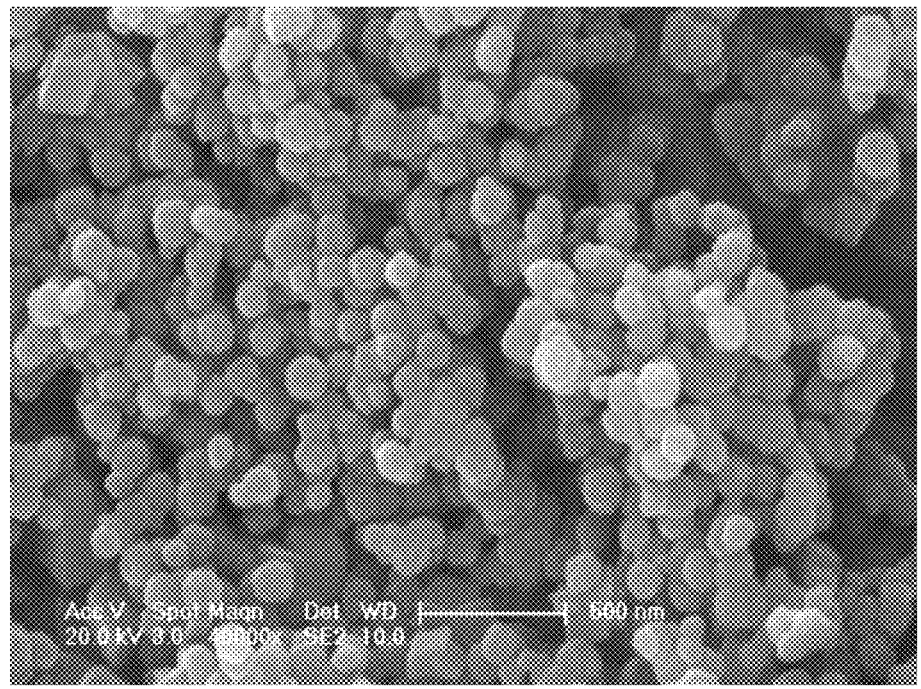
FIG. 7 is a morphology structural diagram of red sedimentation at the bottom.
Figure 8:
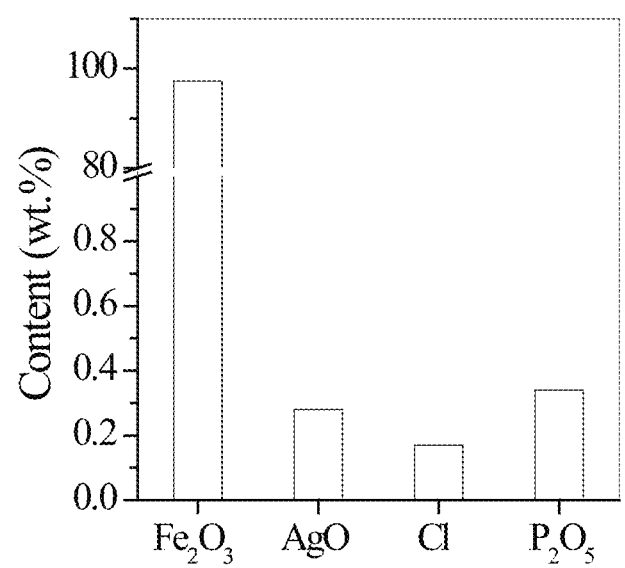
FIG. 8 is a diagram showing analyzed content of each component.

IV. An XRD graph of red sedimentation at the bottom was as shown in FIG. 6, the morphology was as shown in FIG. 7, and the component analysis was as shown in FIG. 8, showing that the content of AgO in red sedimentation was less than 0.3 wt. %.

Although preferred embodiments of the present application have been described, however, once knowing basic inventive concepts, those skilled in the art can make additional alterations and modifications to these embodiments. Therefore, the appended claims intend to encompass the preferred embodiments and all the alterations and modifications falling within the scope of the present application. Apparently, those skilled in the art can make various changes and variations to the present application without departing from the spirit and scope of the present application. In this way, if these modifications and variations of the present application fall within the scope of claims of the present application and equivalent technologies, then the present application also tends to encompass these changes and variations.

The invention claimed is:

1. High-purity separation method of iron ions from an aqueous solution containing heavy metal ions, comprising the following steps:
   selecting an aqueous solution containing heavy metal ions, including
   the heavy metal in the aqueous solution refers to a metal with a density of greater than 4.5 g/cm³ and a concentration of greater than 0.02 mg/L;
   pretreating an aqueous solution containing heavy metal ions by
   adding ferric salt to the aqueous solution;
   adjusting the pH value of the aqueous solution to 8-11; and collecting sedimentation at the bottom;
dissolving sedimentation to obtain a dissolved solution by using a nitric acid solution or a sulfuric acid solution, until crystals are generated at the bottom or the pH value of the aqueous solution is −0.5-1.9;
treating the dissolved solution with a reducing agent to obtain a treated aqueous solution;
conducting hydrothermal reaction by
transferring the treated aqueous solution into a reactor, with a degree of filling of the reactor being 30%-80%, heating the reactor in an airtight manner to 120-500° C., keeping the temperature for 0.1-48 h, and naturally cooling it to room temperature; and
judging a reaction endpoint by
opening the reactor, and red sedimentation is generated at the bottom, wherein the sedimentation is mainly $Fe_2O_3$ with a purity of greater than 98.5%, an amount of residual iron in the supernatant is less than 0.4 mg/L, and a retention rate of heavy-metal ions is greater than 95%,
wherein if the amount of residual iron in the supernatant is more than 0.4 mg/L, repeat conducting the hydrothermal reaction.

2. The method of claim 1, wherein in the step of adding ferric salt to the aqueous solution, the ferric salt comprise polymerization ferric chloride, polymeric ferric sulfate or polymerized ferric nitrate and the added dosage are separately 0.1-1 g/L.

3. The method of claim 1, wherein the concentration of nitric acid or sulfuric acid in the step of dissolving sedimentation is 35%-65%; and
the solution treated with nitric acid or sulfuric acid, the concentration of iron ions is higher than 100 mg/L, and the concentration of heavy metal ions is higher than 40 mg/L.

4. The method of claim 1, wherein after the sedimentation is dissolved with nitric acid solution, the reducing agent is added directly into the solution obtained by dissolving.

5. The method of claim 1, wherein the dissolving sedimentation is performed by using the sulfuric acid solution, and after the sedimentation is dissolved, sodium nitrate or sodium nitrite is added into the solution obtained by dissolving, and then the reducing agent is added.

6. The method of claim 5, wherein an added dosage of sodium nitrate or sodium nitrite is calculated according to a molar ratio of sodium nitrate or sodium nitrite to iron ions in the solution to be greater than 0.5.

7. A high-purity separation method of divalent iron ions from solids containing heavy metal ions, comprising the following steps:
(1) dissolving solids or sedimentation containing heavy metals and iron into a sulfuric acid solution, until the pH value of the solution is −0.5-1.9;
(2) transferring the solution obtained in step (1) into a first reactor, with a degree of filling being 30%-40%;
(3) closing the reactor in an airtight manner, after the temperature rises to 120° C., adding sodium nitrite through a feeding pipe, wherein the added dosage is calculated according to the molar ratio of sodium nitrite to iron ions to be greater than 0.5;
(4) transferring a treated aqueous solution obtained from the step (3) into a second reactor, with a degree of filling of the reactor being 30%-80%, followed by adding a reducing agent into the solution obtained from the step (3), heating the reactor in an airtight manner to 120-500° C., keeping the temperature for 0.1-48 h, and naturally cooling it to room temperature; and
(5) opening the reactor, and red sedimentation is generated at the bottom, wherein the sedimentation is mainly $Fe_2O_3$ with a purity of greater than 98.5%, the amount of residual iron in a supernatant is less than 0.4 mg/L, and the retention rate of ions is greater than 95%,
wherein if the amount of residual iron in the supernatant is more than 0.4 mg/L, repeat the step (4).

8. The method of claim 7, wherein the concentration of used sulfuric acid is 35%-65%, and the solution treated with sulfuric acid, the concentration of divalent iron ions is greater than 100 mg/L, and the concentration of heavy metal ions is greater than 40 mg/L.

9. The method of claim 1, wherein the reducing agent is levulinic acid, or a mixture containing levulinic acid, the mixture comprises pyruvic acid, lactic acid, lactose, galactose and levulinic acid, and a mixture ratio of the pyruvic acid, lactic acid, lactose, galactose and levulinic acid in the mixture is 1:1:5:1:100.

10. The method of claim 9, wherein a dosage of added reducing agent is calculated according to a molar ratio of a sum of total molar amounts of each component in the reducing agent to iron in the solution is 0.1-10.

* * * * *